United States Patent [19]

Rappoldt et al.

[11] Patent Number: 4,898,105
[45] Date of Patent: Feb. 6, 1990

[54] FILTER DEVICE

[75] Inventors: Louis M. Rappoldt, DV Ugchelen; Peter H. DeHaan, PE Delft, both of Netherlands

[73] Assignee: Nederlandse Organisatie voor Toegepastnatuurwetenschappelijk Onderzoek TNO, The Hague, Netherlands

[21] Appl. No.: 295,345

[22] Filed: Jan. 10, 1989

[51] Int. Cl.⁴ .............................................. F23G 5/00
[52] U.S. Cl. ..................................... 110/245; 55/131; 55/120; 55/138; 110/216; 422/177; 422/180
[58] Field of Search .......................... 55/120, 130–132, 55/135, 136–138, 154, 155; 110/245, 216; 422/177, 180

[56] References Cited

U.S. PATENT DOCUMENTS 2,759,877 8/1956 Eron ....................................... 196/52
3,365,858 1/1968 Penney .................................. 55/120
3,733,784 5/1973 Anderson et al. ..................... 55/117

FOREIGN PATENT DOCUMENTS

WO8100524 3/1981 European Pat. Off. .
0035973 9/1981 European Pat. Off. .
1457095 10/1969 Fed. Rep. of Germany .
3516693 11/1986 Fed. Rep. of Germany .
119412 9/1980 Japan ...................................... 55/523

Primary Examiner—Bernard Nozick
Attorney, Agent, or Firm—William H. Elliott, Jr.; Richard L. Hansen

[57] ABSTRACT

Filter device for removing entrained fine solid particles from a gas stream, comprising a charging system (12) and an electrified granular filter (11) downstream of the charging system which is formed by at least one layer (14) of granules of non electrically conducting material and means for forming an electric field across the granules, the granule layer (14) being formed by a self-supporting, highly porous body, such as a body constructed of granules which are sintered together to form a sintered self-supporting granule layer.

10 Claims, 3 Drawing Sheets

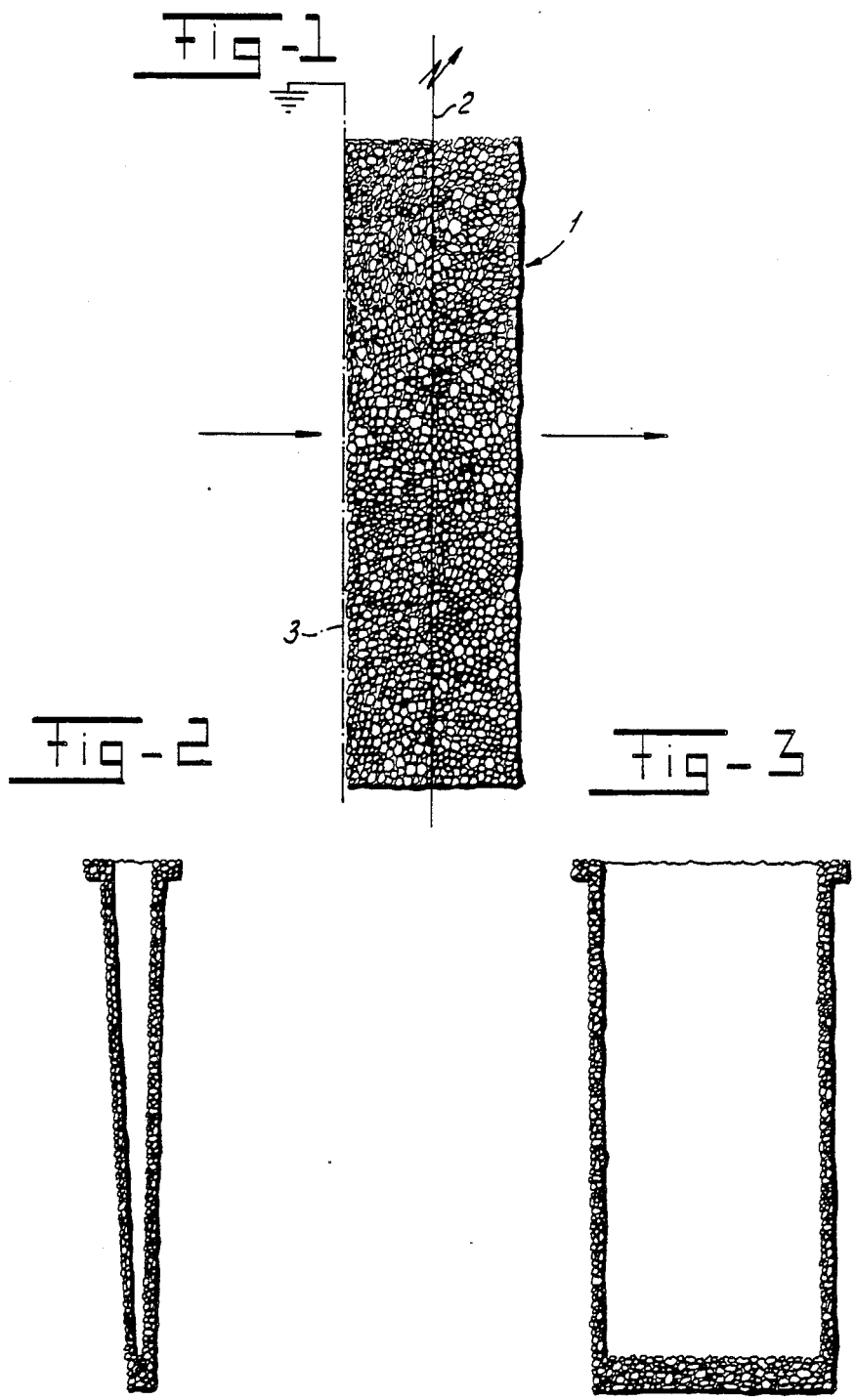

FILTER DEVICE

The invention relates to a filter device for removing entrained fine solid particles from a gas stream, comprising a charging system for giving an electric charge to the particles and an electrified granular filter which is situated downstream of the charging system and which is formed by at least one layer of granules of a non electrically conducting material and means for forming an electric field across the granules which comprise a polarization element, in particular an electrode, at one side and an earthed element at the other side. Such a filter device is known from WO-A-8,100,524.

In the known filter device, the granule layer is formed by a layer of loose granules confined between two, in general grid-type walls.

Since said loose granules are set in motion by the gas stream flowing through the layer when the known device is in operation and then rub along each other, as a result of which the dust particles deposited on the granules are released again, the dust particles trapped in the layer are transported further into the layer so that to trap dust effectively, the layer has to be relatively thick, in the order of 10-15 cm. At the same time clogging up of the openings in the grid-type walls, in particular the wall situated downstream, by deposited dust particles has to be prevented, so that in particular, the lastnamed containment wall has to be of a special, relatively complicated and, consequently, expensive construction.

Further, the cleaning of the granule layer presents a problem since this cannot be done on site by means of pulses of compressed gas in the opposite direction which would have as the sole effect that the granules blown loose from each other. Consequently, in the known device the granules in the layer are kept continuously in motion and are removed at the bottom of the layer to a separate cleaning device from which clean granules are fed to the top of the layer. Such a cleaning requires expensive additional equipment. At the same time, the generation of a high electric field is necessary in order to prevent trapped dust particles being released again by the mutual movements of the granules occurring as a consequence of the continuously moving granule layer.

The object of the invention is to provide a device of the type mentioned which does not have the disadvantages of the type mentioned.

This object is achieved in that, in the device according to the invention, the granule layer is formed by a self-supporting, highly porous body, such as a body constructed of granules which are sintered together to form a sintered self-supporting granule layer.

As a result of the use of a sintered self-supporting granule layer, containment walls do not have to be provided, as a result of which the device is simpler and the risk that the openings in said walls clog up has been removed, while the granule layer can be thinner, namely approx. 3 cm, for effective dust trapping.

In addition, the granules can in fact now be cleaned by, for example, producing gas pressure pulses in the opposite direction through the layer, optionally accompanied by additional means such as ultrasonic vibration.

In an advantageous manner, the invention offers the possibility that the granule layer is constructed of a number of layers of granules of various sizes and/or various chemical compositions.

In particular, an outermost layer of the granule layer may be constructed at least partially of granules of an electrically conducting material so that said layer can form the earthed side of the granule layer and is used to form the electric field together with the electrode mentioned which is situated inside the layer. Such an earthed side can, however, also be obtained by a coating or covering layer, provided on the granule layer.

As a result of the absence of containment walls for the granule layer, which, for practical consideration, are composed of metal, the device according to the invention is suitable, in particular, for use in gas streams of very high temperature, such as for the removal of fly ash from the gases of a gasification installation or a fluidized bed combustion installation under pressure, the hot gases being passed through a gas turbine.

In particular, the device according to the invention is suitable for use in a combustion installation having means for forming a fluidized bed with air having at least one fuel, the filter device being provided in the free combustion zone or the so-called freeboard situated above the fluidized bed.

The solid particles entrained by the air and the combustion gases from the fluidized bed are then retained by the filter device, where said particles have such a long residence time that, if the temperature is sufficiently high, they are able to burn completely. In this manner, not only is a longer residence time of the entrained solid particles in the free board obtained, and consequently an improved combustion efficiency, but the granular filter also removes the fly ash from the combustion gases to such an extent that no separate separators and filters have to be provided in the combustion gas discharge.

Since the fly ash deposits as a filter cake on the granule layer, it is necessary for means to be present for periodically removing said filter cake, which are preferably formed by means for producing reverse gas pressure pulses so that the filter cake is knocked off by these pressure pulses and fall off into the freeboard and into the bed. In this process, the fly ash concentration in the freeboard will, however, increase and this has to be prevented by means for removing the excess of fly ash from the device.

The device is described in more detail with reference to the drawing, wherein

FIG. 1 shows a granule layer according to the invention,

FIGS. 2 and 3 show sections in two directions of a filter element constructed of granule layers.

Figure 5:
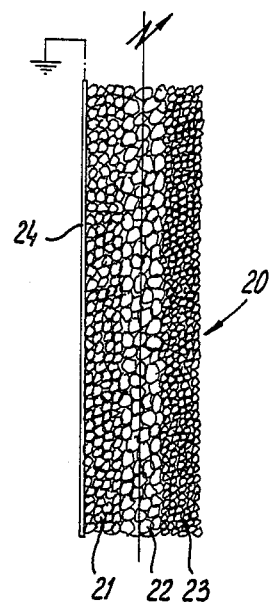

FIG. 5 shows a granule layer 20 formed by a number of layers 21, 22, 23 of granules of various sizes and an earthed side formed by covering layer 24.

Figure 6:
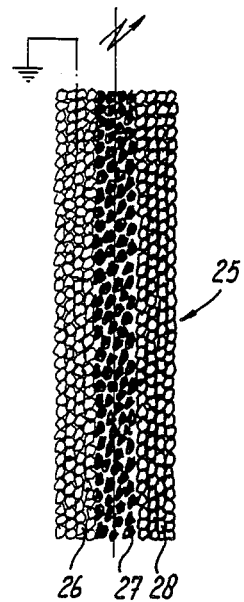

FIG. 6 shows a granule layer 25 formed by a number of layers 26, 27, 28 of granules of various chemical compositions, the earthed side being formed by outermost layer 26 which is constructed at least partially of granules of an electrically conducting material.

Figure 7:
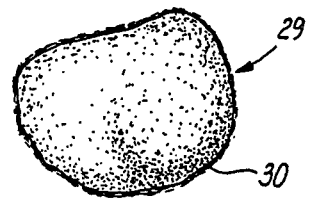

FIG. 7 shows a granule 29 provided with a catalyst 30.

As FIG. 1 shows, the granule layer is formed by a large number of originally loose granules which have been sintered together to form a self-supporting construction. The granules preferably have a smooth surface but do not need to be round. The size of the granules is 0.2–2.5 mm, preferably 1.5–2 mm. Furthermore, the granules are composed of an electrically insulating material in order to maintain the electric field. For a relatively low temperature, for example, a plastic may be chosen, for moderately high temperature, granules based on $SiO_2$ are suitable, while for high temperatures, granules based on $Al_2O_3$ or carbides can be used.

Within the granule layer there is a high voltage grid 2, while at the outside, an earthed grid 3 is provided, as a result of which an electric field can be maintained across the granule layer.

Instead of such a grid 3, however, at least a portion of the outermost layer of the granular layer 1 situated opposite the grid 3 in FIG. 1 may also be constructed of granules of an electrically conducting material. It is also possible, instead of the grid 3, to provide an electrically conducting coating on the side of the granule layer situated adjacent thereto.

The form in which the granule layer is made depends on the use and the available space. Both flat plates and cylindrical elements may be manufactured, while large elements constructed of, for example, plates may be used.

FIGS. 2 and 3 show a filter element which is constructed up of plates of granules sintered together.

Figure 4:
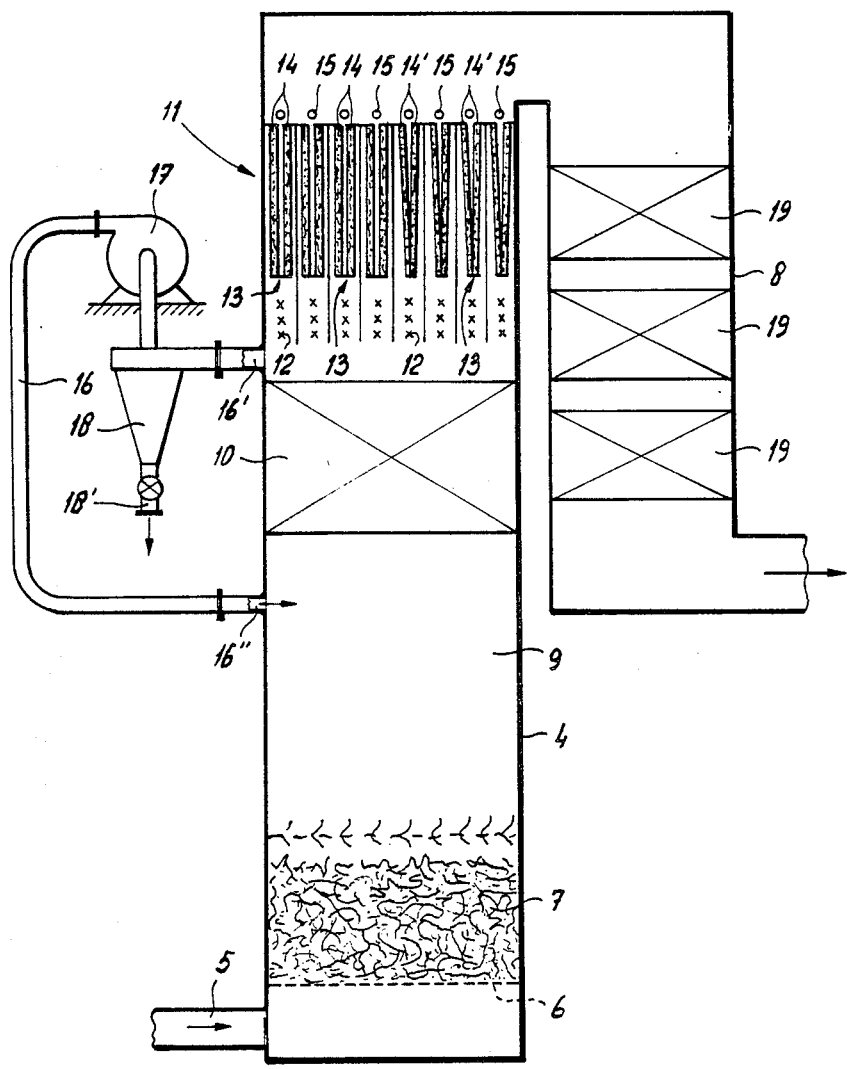
FIG. 4 shows the use of a filter device according to the invention in a combustion installation having a fluidized bed.

As shown in FIG. 4, a filter device according to the invention can be used in an advantageous manner in a combustion installation having a fluidized bed.

The combustion installation comprises a housing 4 with an inlet 5 for the fluidizing combustion air and a discharge 8 for the combustion gases. In the housing 4 a grid-type distribution plate 6 is provided on which the bed 7 of a granular material to be fluidized rests, which material is supplied by means not shown.

In the freeboard 9 present above the bed 7 there is a heeated surface 10 and above that an electrified granular filter 11 with a charging system situated downstream thereof, comprising the corona wires 12.

The granular filter 11 is constructed of a number of filter elements 13, which are each formed by two sintered self-supporting granule layers 14, which either run parallel to each other or, as shown by the granule layers 14, taper towards each other in the downward direction and are up against each other at the bottom ends.

Above every filter element 17, a nozzle 15 is provided by means of which gas pressure pulses can be produced in the spaces between the granule layers 14 of every filter element to remove the filter cake deposited on the granule layers.

Said filter cake, composed chiefly of fly ash, then falls down from the filter elements into the freeboard 9 and possibly into the bed 7. As a result of this, the fly ash concentration in the freeboard will increase, and this is unacceptable. For this reason, a circulating extraction line 16 is provided which incorporates an extraction device 17 and a cyclone separator 18 and which debouches at one end at 16′ beneath the charging system 12 and at the other end at 16″ beneath the heating surface 10 in the freeboard 9. During operation a portion of the gases is extracted from the freeboard via 16′ and passed through the cyclone separator 18, where the fly ash is removed from these extracted gases and is discharged at 18′, and the fly gases thus purified are returned at 16″ to the freeboard again.

In the combustion bases discharge 8, a number of heated surfaces 19 are provided which cannot become contaminated since the combustion gases flowing through them have been purified by means of the granular filter 11 and consequently contain no solid particles, or virtually no solid particles.

We claim:

1. Filter device for removing entrained fine solid particles from a gas stream, comprising a charging system for giving an electric charge to the particles and an electrified granular filter which is situated downstream of the charging system and which is formed by at least one layer of granules of a non electrically conducting material and means for forming an electrical field across the granules which comprise a polarization electrode at one side and an earthed electrode at the other side, in which the granule layer is formed by a self-supporting, highly porous body, constructed of granules which are sintered together to form a sintered self-supporting granule layer.

2. Device according to claim 1, characterized in that the device is provided in a free combustion zone of a combustion installation with means for forming a fluidized bed with air having at least one fuel.

3. Filter device according to claims 1 and 2, in which means are present for removing the fine solid particles deposited on and in the granule layer, characterized in that said means are formed by means for producing reverse gas pressure pulses through the granule layer.

4. Device according to claims 1 or 2, characterized in that the granule layer is constructed of a number of layers of granules of various sizes.

5. Device according to claims 1 or 2, characterized in that the granule layer is constructed of a number of layers of granules of various chemical compositions.

6. Device according to claims 1 or 2, characterized in that at least a portion of the granules is provided with a catalyst for promoting chemical reactions in the gas phase.

7. Device according to claims 1 or 2, in which the means mentioned for forming an electric field comprise an earthed side of the granule layer, characterized in that said side is formed by an outermost layer of the granule layer which is constructed at least partially of granules of an electrically conducting material.

8. Device according to claims 1 or 2, in which the means mentioned for forming an electric field further comprise an earthed side of the granule layer, characterized in that said side is formed by a covering layer of an electrically conducting material.

9. Device according to claim 2, characterized in that means are present for removing the excess of fly ash from the free combustion zone.

10. Device according to claim 9, characterized in that the means present are formed by an extraction line running outside the combustion installation, one end of which debouches beneath the charging system of the filter device and the other end at a distance thereunder in the free combustion zone, said line incorporating a separator, cyclone, and an extraction device.

* * * * *